United States Patent
Wertz et al.

(10) Patent No.: US 11,794,177 B2
(45) Date of Patent: Oct. 24, 2023

(54) SURFACE-MODIFIED LIGHT UPCONVERSION SILICA PARTICLES

(71) Applicant: International Business Machines Corporation, Armonk, NY (US)

(72) Inventors: Jason T. Wertz, Pleasant Valley, NY (US); Brandon M. Kobilka, Fishkill, NY (US); Sarah K. Czaplewski-Campbell, Rochester, MN (US); Eric J. Campbell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 16/988,236

(22) Filed: Aug. 7, 2020

(65) Prior Publication Data

US 2022/0040683 A1     Feb. 10, 2022

(51) Int. Cl.
  *B01J 31/18*    (2006.01)
  *B01J 21/08*    (2006.01)
  *B01J 31/02*    (2006.01)
  *B01J 35/00*    (2006.01)
  *B01J 37/02*    (2006.01)

(52) U.S. Cl.
  CPC ............ *B01J 31/183* (2013.01); *B01J 21/08* (2013.01); *B01J 31/0271* (2013.01); *B01J 31/1815* (2013.01); *B01J 35/004* (2013.01); *B01J 35/0006* (2013.01); *B01J 37/0217* (2013.01); *B01J 37/0221* (2013.01); *B01J 37/0228* (2013.01); *B01J 2231/005* (2013.01); *B01J 2531/008* (2013.01); *B01J 2531/824* (2013.01); *B01J 2531/828* (2013.01)

(58) Field of Classification Search
  CPC ....................................................... B01J 21/08
  See application file for complete search history.

(56) References Cited

U.S. PATENT DOCUMENTS

| 9,429,681 B2 | 8/2016 | Murakami et al. |
| 2014/0271894 A1 | 9/2014 | Boday et al. |
| 2015/0362500 A1* | 12/2015 | Anker .................. G01N 23/223 600/431 |
| 2018/0311353 A1 | 11/2018 | Kohane et al. |

(Continued)

FOREIGN PATENT DOCUMENTS

| CN | 103980322 B | 8/2014 |
| CN | 105503887 B | 4/2016 |

(Continued)

OTHER PUBLICATIONS

List of IBM Patents or Patent Applications Treated as Related, Aug. 6, 2020, 2 pgs.

(Continued)

*Primary Examiner* — Peter F Godenschwager
(74) *Attorney, Agent, or Firm* — Kelsey M. Skodje

(57) ABSTRACT

A composition, method, and article of manufacture are disclosed. The composition includes a silica particle with light upconversion molecules bound to its surface. The method includes obtaining silica particles and light upconversion molecules having sidechains with reactive functional groups. The method further includes binding the light upconversion molecules to surfaces of the silica particles. The article of manufacture includes the composition.

20 Claims, 7 Drawing Sheets

(56) References Cited

U.S. PATENT DOCUMENTS

2019/0169495 A1    6/2019    Vadrucci et al.
2019/0275151 A1    9/2019    Campos et al.

FOREIGN PATENT DOCUMENTS

| CN | 108587612 A | 9/2018 |
|----|-------------|--------|
| KR | 101754777 B1 | 7/2017 |
| WO | 2014117203 A1 | 8/2014 |
| WO | 2015059180 A9 | 4/2015 |

OTHER PUBLICATIONS

Ravetz et al., "Photoredox catalysis using infrared light via triplet fushion upconversion," https://www.nature.com/articles/s41586-018-0835-2, 346 | Nature | vol. 565 | Jan. 17, 2019, @2019 Springer Nature Limited, 4 pgs.

Stober et al., "Controlled growth of monodisperse silica spheres in the micron size range," Journal of Colloid and Interface Science 26, 62, 69, (1968).

Wertz et al., "Light Upconversion Silica Particles," U.S. Appl. No. 16/988,191, filed Aug. 7, 2020.

\* cited by examiner

201

230

1. BF$_3$OEt$_2$, DCM
2. DDQ
3. [PtCl$_2$(PhCN)$_2$], PhCN

240

SURFACE-MODIFIED LIGHT UPCONVERSION SILICA PARTICLES

BACKGROUND

The present disclosure relates to materials for triplet fusion light upconversion and, more specifically, to silica particles with surface-bound light upconversion molecules.

Photoredox-catalyzed reactions require single electron transfer mediated by a photocatalyst. The photocatalyst can carry out this electron transfer when in an excited state caused by absorption of a photon. The amount of energy required to reach the redox-active excited state varies amongst photocatalysts, but generally wavelengths of light ranging from visible to ultraviolet (UV) must be absorbed. For example, some organic dyes are excited by absorption of yellow light, and some transition metal complexes are excited by absorption of blue light. These organic dyes and transition metal complexes can, therefore, act as photocatalysts when exposed to yellow or blue light, respectively.

SUMMARY

Various embodiments are directed to a composition that includes a silica particle with light upconversion molecules bound to its surface. The light upconversion molecules can be molecular sensitizers and/or molecular annihilators. The surface-modified particle can have one face with surface-bound sensitizers and another face with surface-bound annihilators.

Additional embodiments are directed to a method of forming surface-modified particles that includes obtaining silica particles and light upconversion molecules having sidechains with reactive functional groups. The method further includes binding the light upconversion molecules to surfaces of the silica particles. The reactive functional groups can be silyl groups. The method can also include forming a reaction environment with the surface-modified particles, a photocatalyst, and a substrate. The light upconversion molecules can include a molecular sensitizer and a molecular annihilator. The molecular sensitizer can be a platinum complex of a porphyrin or a palladium complex of a phthalocyanine. The molecular annihilator can be a furanyldiketopyrrolopyrrole or a perylene. The silica particles can be Janus particles.

Further embodiments are directed to an article of manufacture that includes a silica particle with light upconversion molecules bound to its surface. The light upconversion molecules can include a molecular sensitizer and/or a molecular annihilator. The molecular sensitizer can be a platinum complex of a porphyrin or a palladium complex of a phthalocyanine. The molecular annihilator can be a furanyldiketopyrrolopyrrole or a perylene. The article of manufacture can also include a photocatalyst.

DETAILED DESCRIPTION

Figure 1:
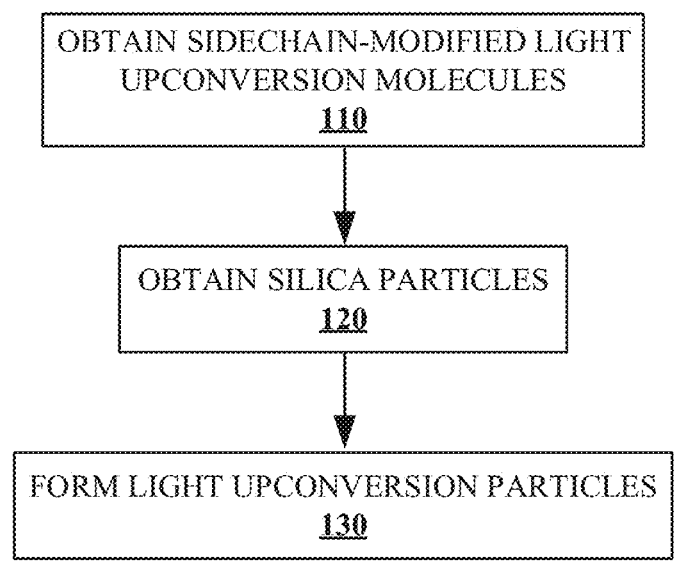
FIG. 1 is a flow diagram illustrating a process of forming light upconversion silica particles, according to some embodiments of the present disclosure.

Light conversion devices are used to convert light (e.g., from solar radiation and/or artificial light sources) into electrical or chemical energy. For example, solar conversion devices can include photocatalysts that absorb solar radiation at the earth's surface. Solar radiation includes ultraviolet (UV) light (~115 nm-380 nm), visible light (~380-750 nm), and near-infrared (NIR) light (~750 nm-2500 nm). The majority of this radiation is in the visible (~41%) and NIR (~42%) regions of the electromagnetic spectrum. The remainder of the solar radiation is primarily UV light (~6%) and mid-infrared light (~1%).

The light absorbed by a photocatalyst in a light conversion device can excite a photocatalyst to a higher energy level ("excited state"), which allows the photocatalyst to donate an electron to a substrate (e.g., a reactant in a photocatalyzed reaction). Most photocatalysts require UV or visible light to transition to an excited state. UV and visible light provide energy ranging from about 50-80 kcal mol$^{-1}$. However, NIR light can only provide energy up to about 35 kcal mol$^{-1}$, which is insufficient for exciting most photocatalysts to the state necessary for single electron transfer (SET). This means that only about half of the energy from solar radiation is available for photocatalytic conversion to chemical and electrical energy. Additionally, the ability of UV and visible light to penetrate most reaction media is much lower than that of NIR light. This can limit the efficacy of UV and visible light in large-scale photocatalyzed reactions.

However, there are techniques for generating visible light by upconverting red or NIR light via triplet fusion. In triplet fusion, there are two molecular species: a sensitizer ([Sen]) and an annihilator ([An]). The sensitizer absorbs a low-energy photon in order to transition to a singlet excited state ($^1$[Sen]*). Herein, "low-energy photon" refers to a photon in the NIR or red region of the electromagnetic (EM) spectrum unless otherwise specified. The specific low-energy photon wavelength(s) required to excite [Sen] to $^1$[Sen]* depends upon the type of molecular sensitizer. This is discussed in greater detail below.

$^1$[Sen]* then decays into a triplet excited state ($^3$[Sen]*), and the $^3$[Sen]* molecules transfer their energy to [An] molecules, resulting in triplet excited state annihilator ($^3$[An]*) molecules. Pairs of $^3$[An*] molecules then undergo triplet fusion, resulting in one of the pair transitioning to a higher energy singlet excited state ($^1$[An]*). $^1$[An]* then decays via fluorescence, emitting a higher energy photon that the low-energy photon absorbed by [Sen]. The higher energy photon can be in the visible spectrum. The energy of the emitted photon can be tuned by the selection of sensitizer/annihilator pairs.

Various organic and metal-complex chromophores can be used as sensitizers and annihilators. For example, a palladium(II) octabutoxyphthalocyanine sensitizer paired with a furanyldiketopyrrolopyrrole annihilator can upconvert low energy photons to photons of about 530-630 nm, enabling activation of photocatalysts that require yellow (e.g., ~560 nm-590 nm) and/or green (e.g., ~520 nm-560 nm) light. Examples of these photocatalysts can include organic compounds such as eosin Y (2',4',5',7'-tetrabromofluorescein) and rose bengal (4,5,6,7-tetrachloro-2',4',5',7'-tetraiodofluorescein). Additionally a platinum(II) meso-tetraphenyltetranaphthoporphyrin sensitizer can be paired with a 2,5,8,11-tetra-tert-butylperylene annihilator to produce blue light (e.g., $\lambda_{max}$=~450 nm). This blue light can activate photocatalysts such as $[Ru(bpy)_3]^{2+}$ and other transition metal complexes.

There is potential for the use of [Sen]/[An] triplet fusion upconversion in photocatalytic systems. For example, photocatalysts can be excited by visible light generated by the triplet fusion upconversion. This can allow the energy from NIR solar radiation to be harnessed for photoredox reactions. However, the use of [Sen]/[An] pairs is limited by the availability of techniques for packaging and incorporating these species into reaction environments for various applications. Therefore, there is a need for new materials that can facilitate the use of NIR-to-visible light upconversion in a variety of photoredox reaction environments.

Micro- and nanoscale silica particles ("light upconversion particles") with surface-bound light upconversion molecules are disclosed herein. Unless otherwise specified, the light upconversion molecules can be sensitizers, annihilators, or a combination thereof. In addition to silica particles, particles of other oxide materials, such as alumina, can be used. Sidechain-modified light upconversion molecules are prepared. Herein, "sidechain-modified" refers to molecules having substituents with reactive functional groups that can bind or adhere to a substrate (e.g., via covalent, ionic, and/or hydrogen bonds). The substrate can be a binding site on the surface of silica particle. For example, molecular sensitizers and molecular annihilators can be sidechain-modified to include silane moieties for binding to hydroxyl groups on the surface of a silica particle. The resulting light upconversion particles can be incorporated into photocatalytic reaction systems. This is discussed in greater detail below.

Figure 2A:
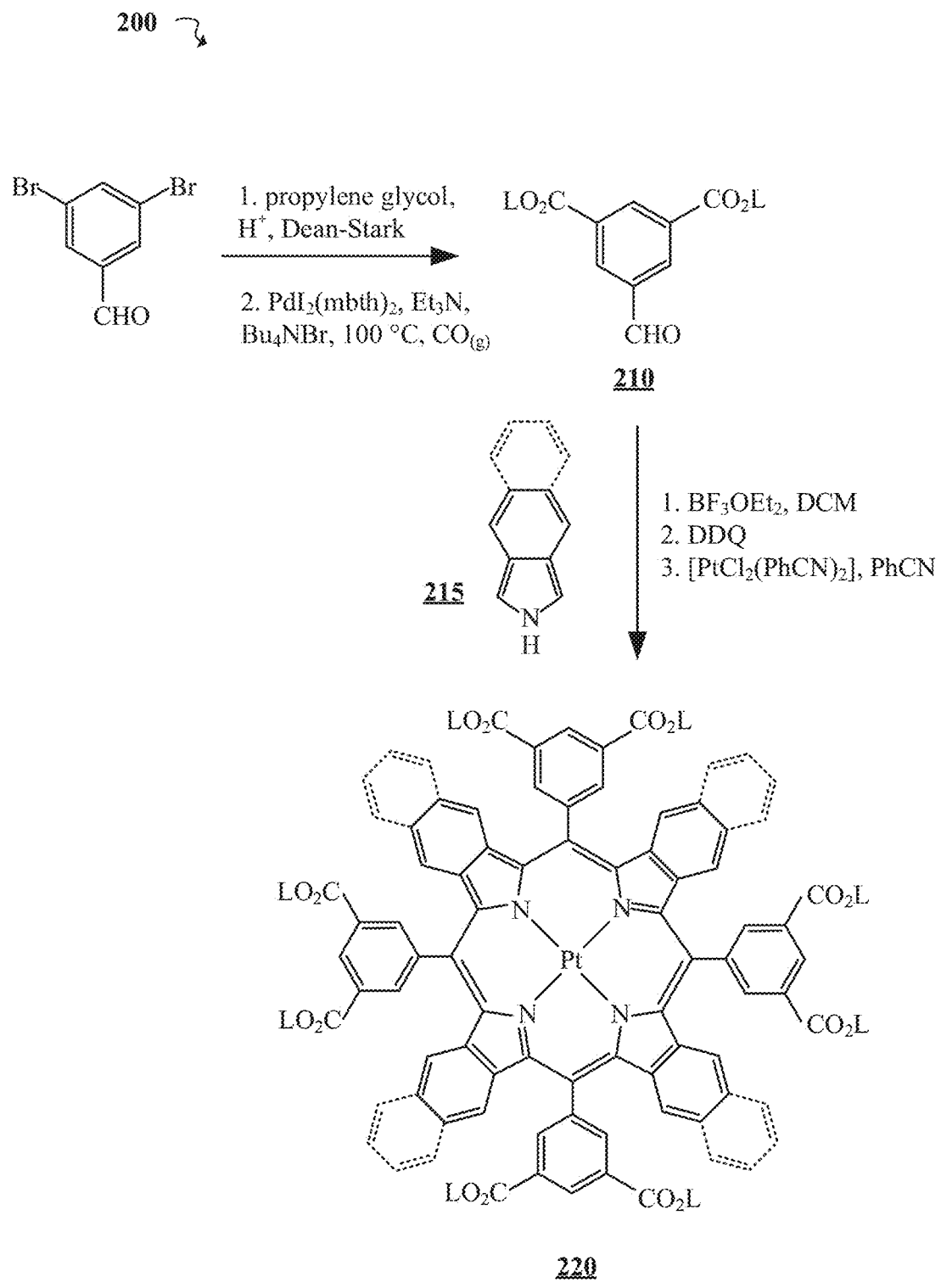
FIG. 2A is a chemical reaction diagram illustrating a process of forming a first sidechain-modified molecular sensitizer, according to some embodiments of the present disclosure.
Figure 2B:
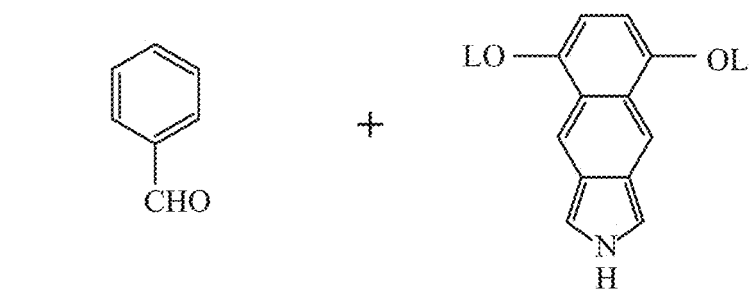
FIG. 2B is a chemical reaction diagram illustrating a process of forming a second sidechain-modified molecular sensitizer, according to some embodiments of the present disclosure.
Figure 2B:
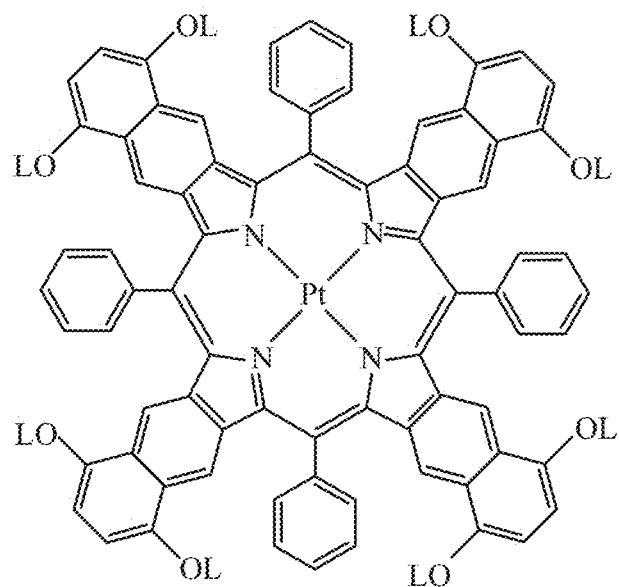
Figure 2C:
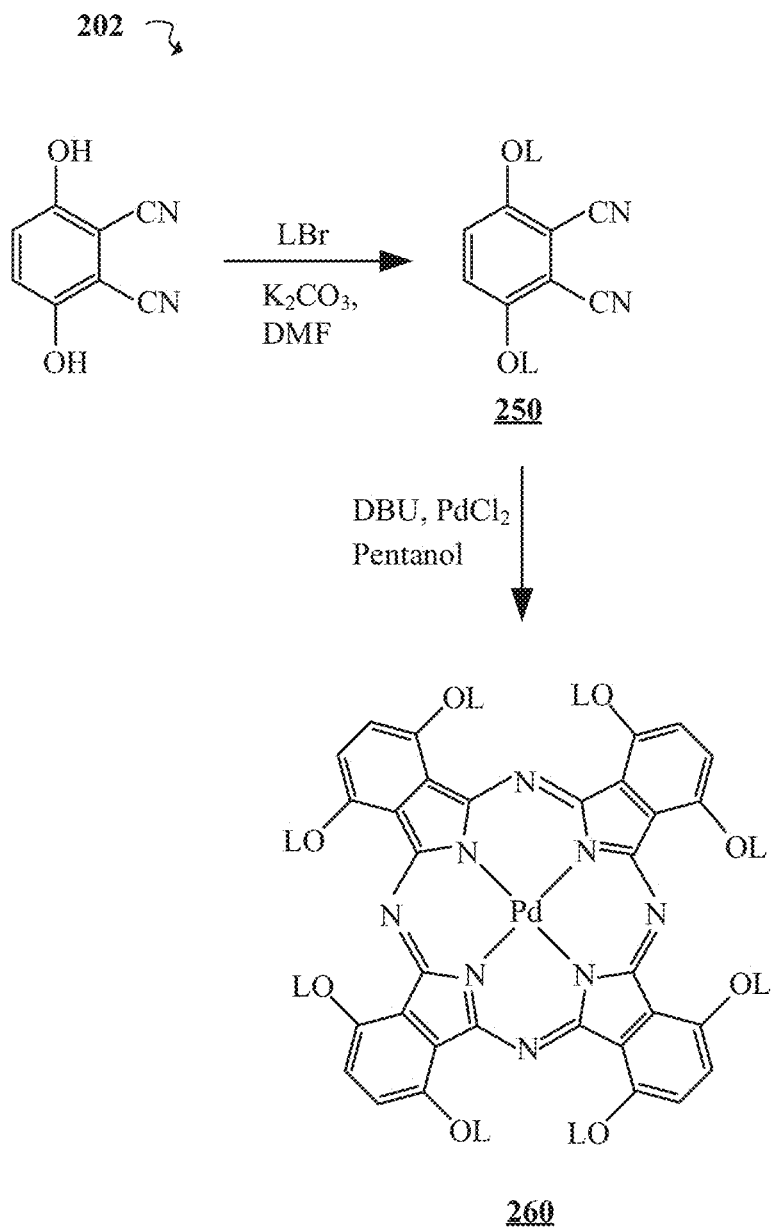
FIG. 2C is a chemical reaction diagram illustrating a process of forming a third sidechain-modified molecular sensitizer, according to some embodiments of the present disclosure.

FIG. 1 is a flow diagram illustrating a process 100 of forming a light upconversion surface-modified silica particle, according to some embodiments of the present disclosure. Sidechain-modified light upconversion molecules are obtained. This is illustrated at step 110. The sidechain-modified light upconversion molecules can be functionalized derivatives of various sensitizer and/or annihilator molecules. Examples of sensitizers can include molecular compounds having high absorption coefficients in the NIR and/or red regions of the electromagnetic spectrum. For example, [Sen] can be a sidechain-modified derivative of platinum(II) tetraphenyltetranaphthoporphyrin (illustrated in FIGS. 2A and 2B) or palladium(II) octabutoxyphthalocyanine (illustrated in FIG. 2C). In FIGS. 2A-2C, functionalized sidechains are represented by L.

However, other compounds capable of absorbing a photon and transferring triplet excitation energy to an annihilator can be selected. Examples of sensitizers that can be prepared with modified sidechains can include metal complexes (e.g., transition metal complexes of porphyrins or phthalocyanines). In some embodiments, the sensitizer is a transition metal (e.g., Pt, Pd, Zn, Cu, Co, Ru(CO), etc.) complex of a β- and/or meso-substituted porphyrin (e.g., 2-(3-[10,15,20-tris(3,5-di-tert-butylphenyl)porphyrin-5-yl]phenoxy)ethanol, octaethylporphyrin, tetrabenzoporphyrin, tetranaphthoporphyrin, tetraphenyltetrabenzoporphyrin, tetraphenyltetraanthraporphyrin, etc.) or a phthalocyanine (e.g., octabutoxyphthalocyanine, octa-triethyleneoxysulfonyl phthalocyanine, etc.). Additional examples of sensitizers that may be used can include metal complexes of sidechain-modified naphthalocyanines, chlorins, and other cyclic tetrapyrroles. Sensitizers can also include fused ring systems that include more than one porphyrin, phthalocyanine, and/or other macrocyclic compound. In some embodiments, the sensitizers can be metal-free macrocyclic compounds such as sidechain-modified porphyrins, phthalocyanines, naphthalocyanines, chlorins, organic dyes such as purpurin, etc.

Figure 3A:
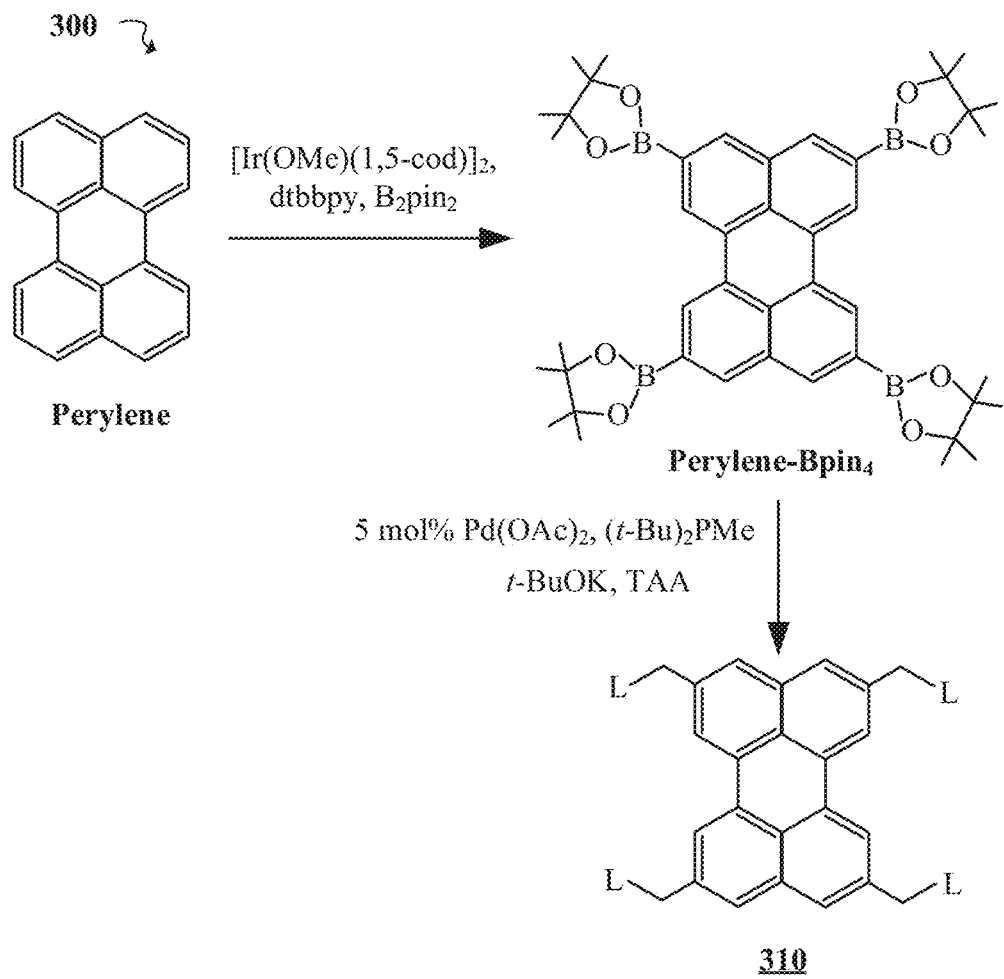
FIG. 3A is a chemical reaction diagram illustrating a process of forming a first sidechain-modified molecular annihilator, according to some embodiments of the present disclosure.
Figure 3B:
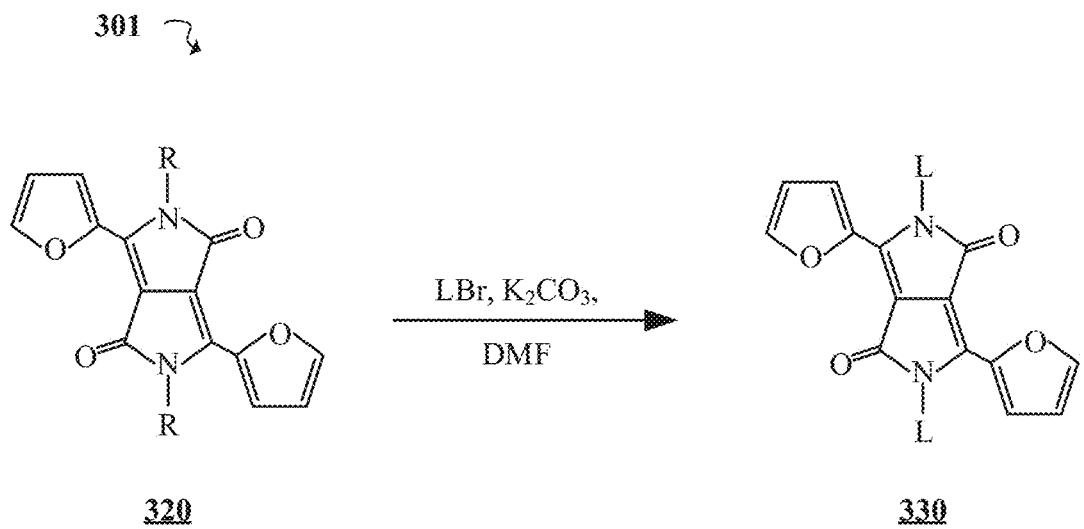
FIG. 3B is a chemical reaction diagram illustrating a process of forming a second sidechain-modified molecular annihilator, according to some embodiments of the present disclosure.

A sidechain-modified [An] can be derived from a molecular annihilator such as a perylene or diketopyrrolopyrrole. Examples of sidechain-modified perylenes and sidechain-modified diketopyrrolopyrroles are illustrated in FIGS. 3A and 3B, respectively. In FIGS. 3A and 3B, functionalized sidechains are represented by L. In some embodiments, the annihilator can be selected from various organic compounds (e.g., fluorophores, chromophores, dyes, etc.) having a high fluorescence quantum yield (e.g., about 0.9-0.95, 0.8-0.99, 0.6-1, etc.). Additional examples of annihilators that can be used can include sidechain-modified derivatives of rubrene (5,6,11,12-tetraphenyltetracene), 9,10-diphenylanthracene, 9,10-bis(phenylethynyl)anthracene, 2,5-diphenyloxazole, etc.

[Sen] and [An] can be selected as a pair based on the wavelength of light that can be absorbed by [Sen] and/or the wavelength of light emitted by $^1$[An]* upon fluorescent decay. For example, in instances where a reaction requires a photocatalyst that absorbs yellow light, an appropriate sensitizer can be paired with an annihilator where decay of $^1$[An]* emits yellow light. Examples of photocatalysts, sensitizers, and annihilators that can be used are discussed in greater detail below. In some embodiments, an annihilator is paired with a sensitizer where the energy of $^3$[Sen]* is slightly higher than that of $^3$[An]. However, any sensitizer where $^3$[Sen]* can transfer sufficient energy to excite [An] to $^3$[An] can be used. Additional factors that can be considered in choosing a [Sen]/[An] pair can include solubility, reactivity, efficiency, etc.

Sidechain-modified light upconversion molecules are obtained via various techniques. Examples of these techniques include synthetic methods discussed in greater detail with respect to FIGS. 2A-3B. The sidechains on the resulting modified [Sen] and [An] molecules can have functional groups trialkylsilyl, trialkoxysilyl, hydroxyl, acetate, vinyl, acrylate, vinylacrylate, carboxylic acid, alkyl, thiol, phenol, styrene, etc. In some embodiments, the sidechain-modified [Sen] and/or [An] can be grafted to a molecule such as a polyethylene glycol (PEG). Additionally, the sidechain functional groups can be altered (e.g., reduced, deprotected, etc.) or replaced (e.g., via substitution reactions) in some embodiments.

Various sidechain modifications can be used to form upconversion molecules having increased solubility in aqueous or polar protic solvents. For example, a sidechain-modified light upconversion molecule can be grafted to a PEG molecule (e.g., PEG polymer or oligomer) having the following structure:

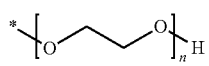

where n is an integer greater than or equal to 1, and where the starred bond is to a functional group such as vinyl, allyl, vinyl ketone (to form acrylate), thiol, amine, epoxide, styrene, etc. In other embodiments, the solubility of the upconversion molecules in non-polar solvents can be increased by attaching sidechains such as linear hydrocarbons or other hydrophobic groups.

Silica particles are formed. This is illustrated at step 120. These light upconversion particles are formed by modifying the surfaces of primary silica particles. While silica ($SiO_4$) particles are illustrated herein, particles formed from oxide materials other than silica can be used (e.g., titania ($TiO_2$), ceria ($CeO_2$), iron oxide (e.g., $Fe_3O_4$), magnesium oxide (MgO), etc.). Herein, "particle" refers to solid nanoparticles or microparticles having an approximately spherical shape. The term "particle size" refers to a particle size evaluated for a spherical object. However, the shapes of particles may be irregular and non-spherical. Therefore, particle size dimensions are based on replacing a given particle with an imaginary sphere having properties (e.g., volume, weight, area, and/or drag coefficient) of the particle. In other embodiments, silica particles can have other structures, such as rods (not shown).

The size of the sphere can be expressed in various ways (e.g. volume, diameter, radius, weight, surface area, etc.). Herein, particle size is defined by diameter unless otherwise specified. For example, "a 200 nm particle" would refer to a particle having a diameter of 200 nm. In real systems, particles are generally present as ensembles having different sizes, and the size for a given ensemble can be described by an average particle size (e.g., median size, geometric mean size, or average size) or a particle size distribution, which is a mathematical function or a list of values that defines average particle size obtained for a sample of particles, sorted according to size.

The particles can be synthesized in situ or obtained from another source (e.g., a commercial source). Synthesis of the silica particles can be carried out using techniques known to those of ordinary skill. For example, tetraethyl orthosilicate (TEOS) can be added to a solution (e.g., an ethanol solution) of water and ammonia ($NH_3$). Ammonia-catalyzed hydrolysis of TEOS produces silanol, followed by condensation to form a suspension of silica particles. The silica particles can be separated from the solution, washed with deionized water and ethanol, and dried. The size of the silica particles can be controlled by adjusting reaction parameters such as pH, temperature, stir speed, reaction time, solvent(s), concentration of reactants, etc. The particles can be micro- or nanoparticles having size distributions within a range of about 1 nm-10 nm, 20 nm 200 nm, 100 nm-200 nm, 20 nm-150 nm, 100 nm-150 nm, 1-10 μm, etc. However, particles of any size can be obtained (e.g., about 1 nm-1000 nm, 1 nm-800 nm, 1 nm-400 nm, 1 nm-200 nm, 10 μm-1000 μm, etc.).

Light upconversion particles are then formed. This is illustrated at step 130. The silica particles prepared at step 120 are modified to include surface-bound upconversion molecules ([Sen] and/or [An]). In some embodiments, both [Sen] and [An] can be on a single particle. In other embodiments, particles having only [Sen] and/or particles having only [An] can be formed. In these instances, light upconversion can occur by interactions between [Sen] molecules on one particle and [An] molecules on another particle. In other embodiments, the light upconversion molecules on the particle can interact with complementary light upconversion particles in a reaction environment with the particle (e.g., in solution).

Figure 4:
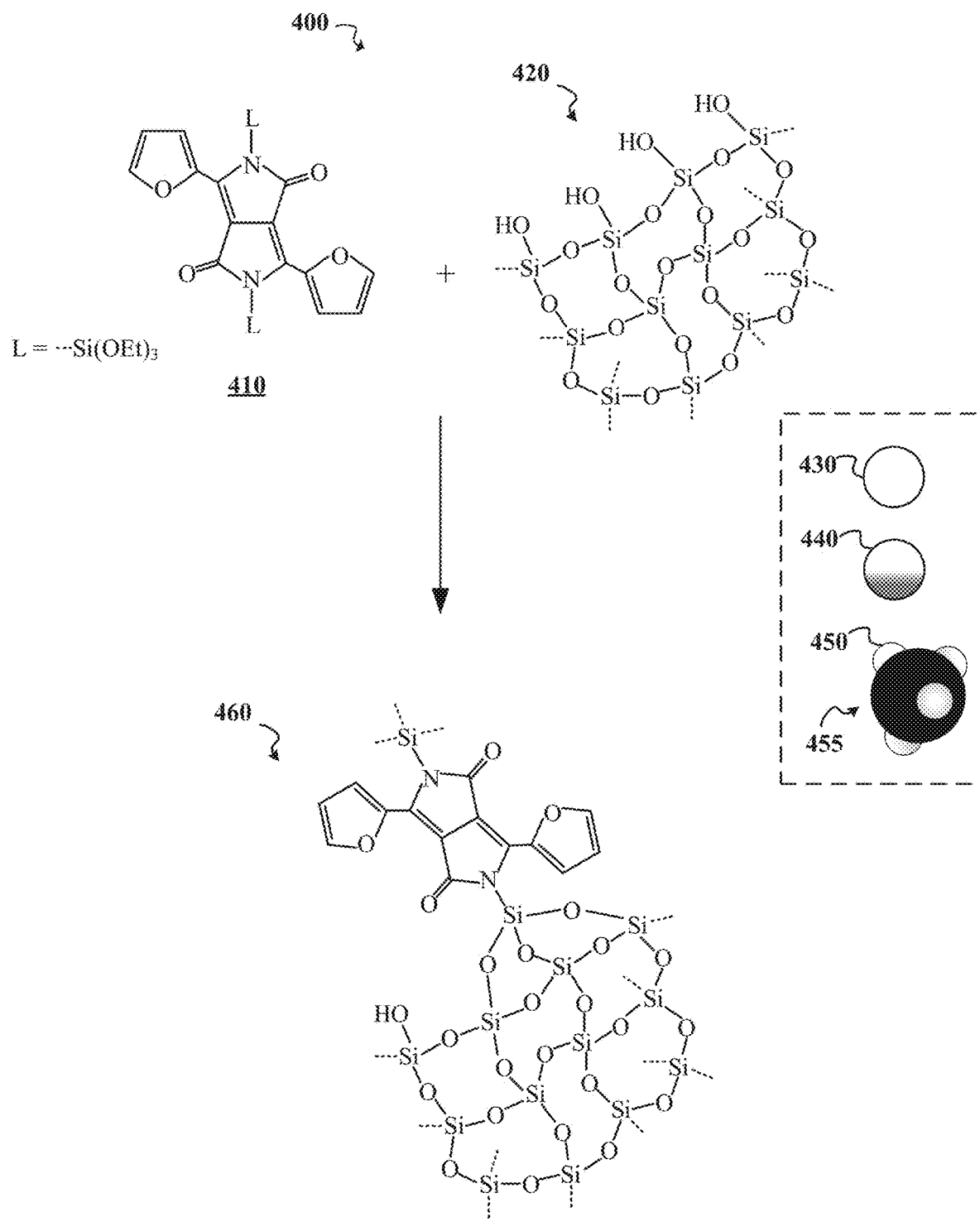
FIG. 4 is a chemical reaction diagram illustrating a process of preparing surface-modified light upconversion particles.

In some embodiments, the light upconversion molecules are distributed over the entire surface of a particle. For example, silane-functionalized light upconversion molecules can react with hydroxyl groups on the surface of the unmodified silica particles formed at step 120. The reaction results in the binding of the light upconversion molecules to the silica particle surface, resulting in surface-modified light upconversion silica particles. Light upconversion molecules can also be bound to a portion of the particle. For example, Janus particles having light upconversion molecules distributed over one particle face can be formed. Herein, "face" refers to an approximate hemisphere on either side of the particle. The approximate hemisphere can include about half the surface area of the particle (e.g., about 40-60% of the particle). Examples of simplified unmodified silica particles and Janus particles are illustrated in FIG. 4.

In some embodiments, Janus particles having [Sen] molecules on one face and [An] molecules on the opposite face can be formed. In other embodiments, Janus particles can have both [Sen] and [An] molecules on one face. Janus particles can also have light upconversion molecules on one face and another type of functionality on the opposite face. For example, a light upconversion Janus particle can have one surface-modified face with moieties for flame retardancy (e.g., organophosphorus or organohalide species), polymer matrix binding (e.g., vinyl, ally, epoxy, etc.), lubrication (e.g., perfluorocarbons), tuning of hydrophobicity (e.g., hydrocarbons, polyethylene glycol, etc.), etc. When only one face of a Janus particle is surface-modified with light upconversion molecules, the opposite face can also be an unmodified silica surface.

Janus particles can be prepared using any appropriate techniques. In some embodiments, the silica particles are resuspended in an approximately 7% w/w $EtOH/H_2O$ solution, and a surfactant, n-cetyltrimethylammonium bromide (CTAB), is added to the suspension (e.g., $C_{CTAB}/S_{silica}$=about $2.5 \times 10^{-6}$ to $5 \times 10^{-6}$ mol $L^{-1}$ $m^{-2}$, where $C_{CTAB}$ is the molar concentration of CTAB, and $S_{silica}$ is the total surface area of the silica particles). In some embodiments, CTAB is replaced by another surfactant, such as sodium dodecyl sulfate (SDS) or sodium lauryl sulfate (SLS). A paraffin wax is added to the suspension, which has been heated to approximately the melting point of the paraffin wax. Paraffin waxes are typically mixtures of long alkanes (e.g., $C_nH_{2n+2}$, where n=20-40) with melting points that depend, at least in part, upon chain length (n). The melting points can range from about 37° C. to about 68° C. When the wax has melted, the suspension can be vigorously stirred using a homogenizer operating at about 9,000 rpm for about 80 s.

The homogenized mixture is then allowed to cool (e.g., to room temperature), resulting in the formation of wax droplets with silica particles partially embedded in the surfaces. These particle-embedded wax droplets are referred to herein as colloidosomes. A simplified example of a colloidosome is illustrated in FIG. 4. The colloidosomes are filtered from the solution, and then washed with acid to remove surfactant from the exposed faces of the embedded silica particles. The exposed faces of the partially embedded silica particles can then be surface-modified (e.g., with sidechain-modified light upconversion molecules or other species). Surface modification of the partially embedded silica particles can be carried out using techniques substantially similar to the surface modification of the free silica particles formed at step 120.

The embedded surface-modified silica particles are removed from the wax droplet. To do so, a hydrophobic solvent (e.g., benzene) can be added to a suspension of the colloidosomes. The hydrophobic solvent dissolves the wax droplets, resulting in a suspension of partially surface-modified Janus particles, which can then be removed from solution, rinsed, and dried. Each partially surface-modified Janus particle has one face with surface functionalities, and one unmodified silica face. This is illustrated in FIG. 4. Various molecular species (e.g., sidechain-modified light upconversion molecules or other functionalities) can then be attached to the unmodified faces via techniques substantially similar to the functionalization of the exposed silica faces of the colloidosome and the functionalization of the free particles. Surface modification of silica particles is discussed in greater detail with respect to FIG. 4.

FIG. 2A is a chemical reaction diagram illustrating a process 200 of forming a first sidechain-modified molecular sensitizer, according to some embodiments of the present disclosure. A mixture containing propylene glycol, 3,5-dibromobenzaldehyde, and a proton ($H^+$) donor (e.g., HCl, $H_2SO_4$, etc.) is prepared. The mixture can be prepared in a Dean-Stark distillation apparatus. In other embodiments (not shown) the 3,5-dibromobenzaldehyde can be replaced by another aryl halide. An alcohol (L-OH) is also added to the reaction mixture in order to provide L sidechain groups. Examples of L groups can include alkyls, PEG molecules, and groups having the structure:

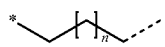

where n is an integer greater than or equal to 1, and where the starred bond is to a moiety such as a protected thiol (e.g., a thioacetate), methylmethacrylate, oxirane, ethylene carbonate, trialkylsilyl, trialkoxysilyl (e.g., triethoxysilyl, trimethoxysilyl, etc.), carboxylic acid, carboxylate ester, acid chloride, a protected phenol (e.g., having a protecting group such as an acyl, sulfonyl, or derivative thereof), etc.

A palladium acetate/triphenylphosphine catalyst (Pd$(OAc)_2$/PPh$_3$, triethylamine (Et$_3$N), and tetra-n-butylammonium bromide (Bu$_4$NBr) are added to the mixture. In some embodiments, other catalysts can be used, such as PdI$_2$(mbth)$_2$, where mbth is 3-methyl-2-benzothiazolinone hydrazone. The mixture is reacted at approximately 100° C. under a carbon monoxide (CO) atmosphere (~100-810 kPa CO$_{(g)}$). This results in esterification of the 3,5-dibromobenzaldehyde to produce an L-functionalized 3,5-dicarboxylate benzaldehyde 210.

The 3,5-dicarboxylate benzaldehyde 210 is combined with a fused benzopyrrole 215 such as isoindole (solid lines) or 2H-benzo[f]isoindole (dashed lines). The 3,5-dicarboxylate benzaldehyde 210 and fused benzopyrrole 215 are mixed with boron trifluoride diethyl etherate (BF$_3$OEt$_2$) in dichloromethane (DCM). In additional steps, 2,3-dichloro-5,6-dicyano-1,4-benzoquinone (DDQ) is added to the reaction, followed by bis(benzonitrile)dichloroplatinum(II) dichloride ([PtCl$_2$(PhCN)$_2$]) in benzonitrile (PhCN). The reaction produces a Pt(II) meso-L-functionalized porphyrin complex ("Pt-meso complex") 220. The Pt-meso complex 220 is a sidechain-modified molecular sensitizer where substituents in meso (methine bridge) positions on the porphyrin ring have L groups.

In some embodiments, the Pt-meso complex 220 can be reacted further to modify the L sidechains. This is not illustrated in FIG. 2A. For example, a methanol/water (10:1) solution of potassium hydroxide (KOH) can be added to the Pt-meso complex 220 in tetrahydrofuran, followed by addition of an acid such as hydrochloric acid in water. The resulting reaction forms a Pt-meso complex with meso substituents with carboxylic acid L groups (not shown). In some embodiments, this carboxylic acid-functionalized derivative of the Pt-meso complex 220 can be reacted with an organohalide compound (e.g., LBr, where L is an alkyl group) and potassium carbonate (K$_2$CO$_3$) in a dimethylsulfoxide/acetone solution. This can produce a molecular sensitizer (not shown) analogous to the Pt-meso complex 220, but where the L groups have been provided by the organohalide compound. Examples of alkyl groups are discussed in greater detail below.

FIG. 2B is a chemical reaction diagram illustrating a process 201 of forming a second sidechain-modified molecular sensitizer, according to some embodiments of the present disclosure. Benzaldehyde is combined with an L-functionalized fused benzopyrrole (2H-benzo[f]isoindole) 230. Examples of L groups are discussed in greater detail with respect to FIG. 2A. The benzaldehyde 210 and L-functionalized fused benzopyrrole 230 are mixed with BF$_3$OEt$_2$ in DCM. Then, 2,3-dichloro-5,6-dicyano-1,4-benzoquinone (DDQ) is added to the reaction, followed by [PtCl$_2$(PhCN)$_2$] in PhCN. The reaction produces a Pt(II) β-L-functionalized porphyrin complex ("Pt-β complex") 240. The Pt-β complex 240 is a sidechain-modified molecular sensitizer where substituents in β (pyrrolic ring) positions on the porphyrin ring have L groups.

In other embodiments, a Pt(II) porphyrin molecular sensitizer having L-functionalized substituents in both meso and β positions on the porphyrin ring can be formed. This reaction is not illustrated in FIG. 2B. The resulting Pt-meso,β complex (not shown) can be formed using substantially similar techniques to those of processes 200 and 201. However, the porphyrin ring-forming reaction can use the L-functionalized 3,5-dicarboxylate benzaldehyde 210 (FIG. 2A) instead of benzaldehyde and the L-functionalized fused benzopyrrole 230 instead of 2H-benzo[f]isoindole, resulting in the P(II) porphyrin complex having L groups on both meso and β positions.

FIG. 2C is a chemical reaction diagram illustrating a process 202 of forming a third sidechain-modified molecular sensitizer, according to some embodiments of the present disclosure. In process 202, 2,3-dicyano-1,4-hydroquinone (DCH) is combined with an organohalide (LX, where X is a halogen atom such as bromine) and K$_2$CO$_3$ in dimethylformamide (DMF). The resulting reaction produces a 2,3-dicyanobenzene-1,4-di-OL ("DC-di-OL") 250. DC-OL 250 is then reacted with 1,8-diazabicyclo[5.4.0]undec-7-ene (DBU) and palladium(II) chloride (PdCl$_2$) in pentanol to produce a sidechain-modified sensitizer referred to herein as a Pd(II) phthalocyanine complex ("PdPc complex") 260.

FIG. 3A is a chemical reaction diagram illustrating a process 300 of forming a first sidechain-modified molecular annihilator, according to some embodiments of the present disclosure. A solution of perylene, (1,5-cyclooctadiene)(methoxy)iridium(I) dimer ([Ir(OMe)(1,5-cod)]$_2$), 4,4'-di-tert-butyl-2,2'-dipyridyl (dtbppy), and bis(pinacolato)diboron (B$_2$pin$_2$) in anhydrous cyclopentane is prepared. Oxygen can be removed from the solution (e.g., by freeze drying at least twice under vacuum). The solution can be stirred at approximately 80° C. under an inert atmosphere (e.g., N$_2$ gas) for about 72 hours. The mixture can then be passed through a silica plug with a chloroform eluent. The solvent can then be removed under reduced pressure. Purification of the resulting residue (e.g., by column chromatography) yields 2,5,8,11-tetrakis(4,4,5,5-tetramethyl-1,3,2-dioxaborolan-2-yl) perylene ("perylene-Bpin$_4$").

Perylene-Bpin$_4$ is then reacted with bis(tert-butyl)methylphosphine ((t-Bu)$_2$PMe), 5 mol % palladium(II) acetate (Pd(OAc)$_2$), and potassium tert-butoxide (t-BuOK) in tert-amyl alcohol (TAA). This reaction results in removal of the 4,4,5,5-tetramethyl-1,3,2-dioxaborolan-2-yl substituents. These substituents are replaced by —CH$_2$L substituents to form a sidechain-modified perylene derivative 310 where each L includes a reactive functional group. Examples of L groups are discussed in greater detail with respect to FIG. 2A.

FIG. 3B is a chemical reaction diagram illustrating a process 301 of forming a second sidechain-modified molecular annihilator, according to some embodiments of the present disclosure. Process 301 involves preparation of a DMF solution containing LBr, K$_2$CO$_3$, and a dialkyl-5-formylisophthalate 320, where alkyl groups are represented by R. Examples of dialkyl-5-formylisophthalates 320 can include dimethyl-, diethyl-, di-propyl, di-ethylhexyl, or di-t-butyl-5-formylisophthalate. In some embodiments, LBr is replaced with another organohalide such as LCl or LI. The reaction results in a sidechain-modified annihilator 330 having L groups in place of the alkyl (R) groups on the unmodified dialkyl-5-formylisophthalate 320.

FIG. 4 is a chemical reaction diagram illustrating a process 400 of preparing surface-modified light upconversion particles, according to some embodiments of the present disclosure. A sidechain-modified annihilator 410 where L is a silyl group is reacted with an unmodified silica particle 420 surface, a portion of which is illustrated. The surface of the silica particle 420 has hydroxyl (—OH) groups, while the interior matrix of the particle is a network of silica-oxygen bonds. In the illustrated portion of the silica particle 420, dashed lines represent bonds to additional oxygen bonds in the matrix. The unmodified silica particle 420 surface can be the surface of a free silica particle 430, an unmodified surface of a Janus particle 440, or an exposed surface of a silica particle 450 in a colloidosome 455. The sizes of the particles 430, 440, 450, and colloidosome 455 are not to scale, and their shapes are simplified for illustrative purposes.

In process 400, silica particles (e.g., 430, 440, and/or 450) can be dispersed in a toluene solution of the sidechain-modified annihilator 410 (e.g., 3 mM annihilator 410) to form a suspension wherein the silica particle surface 420 is exposed to the annihilator 410. The suspension can be stirred for about four hours at about 80° C., whereupon the tri-ethoxysilyl L groups of the annihilator can react with hydroxyl groups on the particle surface 420 to form a surface-modified light upconversion particle. A portion 460 of this particle is illustrated in FIG. 4. The surface-modified light upconversion silica particles formed in process 400 can be filtered from the solution, washed with toluene and ethanol, and dried.

The illustrated surface-modified particle portion 460 includes one molecule of the annihilator 410, where dashed lines represent bonds to oxygen atoms (e.g., additional oxygen atoms at the particle surface or unreacted L sidechain triethoxysilyl groups). Dashed lines in the silica particle matrix of the particle portion 460 represent bonds to additional oxygen atoms in the matrix. The number of hydroxyl groups on the surface of the particle that will react with the annihilator 410 varies based on factors such as reaction conditions (e.g., temperature, duration, mixing, solvent components, etc.), steric properties, and reactivity. In some embodiments, about 60-90% of the available silica hydroxyl groups react to bind the light upconversion molecules. However, other amounts of light upconversion surface-binding are possible (e.g., surface area coverages of ~30-60%, ~10-30%, ~1-99%, etc.).

While not illustrated in FIG. 4, the annihilator 410 can optionally be replaced with a sidechain-modified sensitizer, such as sensitizer 220, 240, or 260 (FIGS. 2A-2C), where L has a silyl moiety. In some embodiments, different sidechain-modified annihilators can be used, such as annihilator 310 (FIG. 3A) where L includes a silyl moiety. In other embodiments, both types of light upconversion molecule can be reacted with the silica particles to form particles having surface-bound sensitizers and annihilators.

In other embodiments, the silica particle 410 or 420 surfaces can be modified to include other functionalities prior to binding of the light upconversion molecules. These functionalities can act as coupling agents to light upconversion molecules with non-silane L groups. For example, reactions at silica particle surfaces with alkoxysilanes such as (3-aminopropyl)triethoxysilane, diethoxy(3-glycidoxypropyl)methylsilane, and (3-mercaptopropyl)trimethoxysilane, can form silica particles having amino, epoxy, and thiol functionalities, respectively. These and other silanization reactions are well-known in the art, and can facilitate surface modification with light upconversion molecules having various sidechain L groups.

Figure 5:
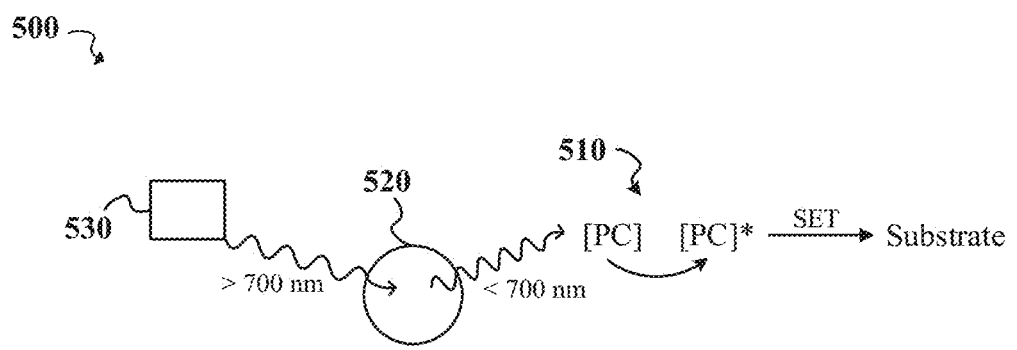
FIG. 5 is a schematic diagram illustrating a photocatalyzed reaction environment, according to some embodiments of the present disclosure.

FIG. 5 is a schematic diagram illustrating a photocatalyzed reaction environment 500, according to some embodiments of the present disclosure. The photocatalyzed reaction environment 500 includes a substrate such as polymerizable molecules (see below) that can accept a photon from a photocatalyst 510. Examples of photocatalysts 510 that can be used can include complexes of transition metals such as ruthenium and iridium. Ruthenium photocatalysts can include [Ru(bpy)]$^{2+}$ (tris(2,2'-bipyridine)ruthenium(II)), [Ru(phen)$_3$]$^{2+}$ (tris(1,10-phenanthroline)ruthenium(II)), [Ru(bpz)$_3$]$^{2+}$ (tris(2,2'-bipyrazine)ruthenium(II)), iridium photocatalysts (e.g., dichlorotetrakis(2-(2-pyridinyl)phenyl) diiridium(III), Ir[p-F(t-Bu)-ppy]$_3$ (tris(2-(3-tert-butylphenyl)-4-tert-butylpyridine)iridium), Ir(ppy)$_3$ (tris[2-phenylpyridinato-C$^2$,N]iridium(III)), etc.), acridinium photocatalysts (e.g., 2,7-dibromo-10-methylacridone, 2,7-dibromo-mesityl-10-methylacridinium tetrafluoroborate, etc.), and organic photocatalysts such as rose bengal, 3DPA2FBN (2,4,6-tris(diphenylamino)-3,5-difluorobenzonitrile), 5,10-di(2-naphthyl)-5,10-dihydrophenazine, eosin Y, etc. However, any appropriate photocatalysts can be used. Additional examples can include tetra-n-butylammonium decatungstate, copper catalysts (e.g., Cu(dap)$_2$Cl, where dap=2,9-bis(p-anisyl)1,10-phenanthroline), metal oxides (e.g., ZnO, TiO$_2$, WO$_3$, ZrO$_2$, etc.), metal sulfides (e.g., CdS), semiconductors, etc.

Reaction environment 500 also includes light upconversion surface-modified silica particles, represented by light upconversion particle 520. The light upconversion particle 520 can provide photons having enough energy to excite the photocatalyst 510 when surface-bound light upconversion molecules on the light upconversion particle 520 are exposed to low energy photons from a light source 530. The light upconversion particle 520 can be a particle such as those formed in processes 100 (FIG. 1) and 400 (FIG. 4).

The light upconversion particle 520 can be suspended in a reaction mixture that contains the photocatalyst 510 and the substrate. In some embodiments, the light upconversion particle 520 is separated from the reaction mixture, but located in close enough proximity to the photocatalyst 510 to allow the photocatalyst 510 to absorb upconverted photons from the light upconversion particle 520. While only one light upconversion particle 520 is illustrated in FIG. 5, it will be understood that reaction environment 500 can contain any appropriate number of substantially similar light upconversion particles. If the light upconversion particle 520 includes only surface-bound sensitizers or annihilators, complementary light upconversion molecules (annihilators or sensitizers, respectively) can be included in the reaction environment 500 via other light upconversion particles, in solution, etc. This is discussed in greater detail above.

The surface-modified particle 520 is exposed to low-energy photons (e.g., wavelengths greater than about 700 nm) from the light source 530. In some embodiments, the light source 530 can also emit higher energy light (e.g., visible, ultraviolet, etc.). The low-energy photons are absorbed and upconverted by light upconversion molecules that include light upconversion molecules on the surface of the light upconversion particle 520. The resulting higher-energy photons are absorbed by the photocatalyst 510 in its ground state ([PC]). The photocatalyst 510 can then transition to a redox-active excited state ([PC]*), followed by single electron transfer (SET) from [PC]* to the substrate.

The substrate can be a reactant in a photocatalyzed reaction. For example, blue light can be generated by a sidechain-modified sensitizer such as a Pt(II) porphyrin complex (see, e.g., FIGS. 2A and 2B) and a sidechain-modified annihilator such as a perylene derivative (see, e.g., FIG. 3A). This blue light can activate the photocatalyst 510 (e.g., $[Ru(bpy)_3]^{2+}$). Reactions that can then be catalyzed using SET from [PC]* can include intramolecular [2+2] cyclization of enones, vinyl azide reduction (e.g., to form pyrroles), and radical polymerization (e.g., to form polymethylmethacrylate).

In some embodiments, compounds disclosed herein can have additional moieties such as epoxides, hydroxyl, propylene carbonate, alkyl halides, esters, alkynes, amines, isocyanates, acid chlorides, chloroformates, alkyls, etc. Herein, "alkyl" refers to $C_1$-$C_{100}$ radicals, which can be linear, branched, or cyclic. Examples of alkyl groups can include methyl, ethyl, n-propyl, iso-propyl, n-butyl, iso-butyl, sec-butyl, tert-butyl, pentyl, hexyl, octyl, cyclopropyl, cyclobutyl, cyclopentyl, cyclohexyl, and cyclooctyl. In some embodiments, the alkyls are unsaturated (e.g., alkenes and alkynes).

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the compounds described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, crosslinking reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and tert-butyl). Further, unless specified otherwise, reference to one member of the group (e.g., n-butyl) includes the remaining isomers in the family (e.g., iso-butyl, sec-butyl, and tert-butyl).

Where different salts of a compound, such as a transition metal complex, exist (e.g., $[Ru(bpy)_3]Cl_2$ and $[Ru(bpy)_3][PF_6]_2$), reference to the compound as an ion (e.g., $[Ru(bpy)_2]^{2+}$ or tris(2,2'-bipyridine)ruthenium(II)) without specifying a counterion (e.g., dichloride or dihexafluorophosphate) is intended to include any available salts of the complex. Further, unless specified otherwise, reference to one counterion (e.g., Cl$^-$) refers to any other appropriate counterion (e.g., $PF_6^-$) for the compound.

Unless otherwise noted, chemical reactions are performed at ambient conditions or under slight heating with no special atmosphere or head space, and may be performed using standard organic solvents to manage mix properties such as viscosity and flow index. Standard procedures for quenching reactions, solvent removal, and purification are performed. Room temperature is between about 15° C. and 30° C. unless otherwise indicated. Ranges (e.g., time, concentration, temperature, etc.) indicated herein include both endpoints and all numbers between the endpoints. Unless specified otherwise, the use of "about," "approximately," or a tilde (~) in connection with a range applies to both ends of the range (e.g., "approximately 1 g-5 g" should be interpreted as "approximately 1 g-approximately 5 g"), and in connection with a list of ranges applies to each range in the list (e.g., "about 1 g-5 g, 5 g-10 g, etc." should be interpreted as "about 1 g-about 5 g, about 5 g-about 10 g, etc."). Unless otherwise indicated, modifying terms such as "about," "approximately," and "~" indicate +/−10% of a recited value, range of values, or endpoints of one or more ranges of values.

The processes discussed herein, and their accompanying drawings, are not to be construed as limiting. One skilled in the art would recognize that a variety of techniques may be used that vary in conditions, components, methods, etc., which ultimately generate light upconversion particles. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may prepare the sidechain-modified light upconversion molecules, and a second entity may carry out the surface modification of the silica particles.

What is claimed is:

1. A composition, comprising:
   a silica particle; and
   light upconversion molecules bound to a surface of the silica particle.

2. The composition of claim 1, wherein the light upconversion molecules comprise molecular sensitizers.

3. The composition of claim 1, wherein the light upconversion molecules comprise molecular annihilators.

4. The composition of claim 1, wherein the light upconversion molecules comprise molecular annihilators and molecular sensitizers.

5. The composition of claim 1, wherein the surface of the silica particle includes a first face and a second face.

6. The composition of claim 5, wherein the light upconversion molecules comprise molecular sensitizers bound to the first face of the silica particle.

7. The composition of claim 6, wherein the light upconversion molecules comprise molecular annihilators bound to the second face of the silica particle.

8. A method of forming surface-modified particles, comprising:
  obtaining silica particles;
  obtaining light upconversion molecules having sidechains with reactive functional groups; and
  binding the light upconversion molecules to surfaces of the silica particles.

9. The method of claim 8, wherein the reactive functional groups are silyl groups.

10. The method of claim 8, further comprising forming a reaction environment, the reaction environment comprising:
  the surface-modified particles;
  a photocatalyst; and
  a substrate.

11. The method of claim 8, wherein the silica particles are Janus particles.

12. The method of claim 8, wherein the light upconversion molecules comprise a molecular sensitizer and a molecular annihilator.

13. The method of claim 12, wherein the molecular sensitizer is a platinum complex of a porphyrin or a palladium complex of a phthalocyanine.

14. The method of claim 12, wherein the molecular annihilator is a furanyldiketopyrrolopyrrole or a perylene.

15. An article of manufacture, comprising:
  a silica particle; and
  light upconversion molecules bound to a surface of the silica particle.

16. The article of manufacture of claim 15, wherein the light upconversion molecules comprise a molecular sensitizer.

17. The article of manufacture of claim 16, wherein the molecular sensitizer is a platinum complex of a porphyrin or a palladium complex of a phthalocyanine.

18. The article of manufacture of claim 15, wherein the light upconversion molecules comprise a molecular annihilator.

19. The article of manufacture of claim 18, wherein the molecular annihilator is a furanyldiketopyrrolopyrrole or a perylene.

20. The article of manufacture of claim 15, further comprising a photocatalyst.

* * * * *